VITTUM & STEVENS.
Breech Loading Fire Arm.
No. 3,653.
Reissued Sept. 28, 1869.
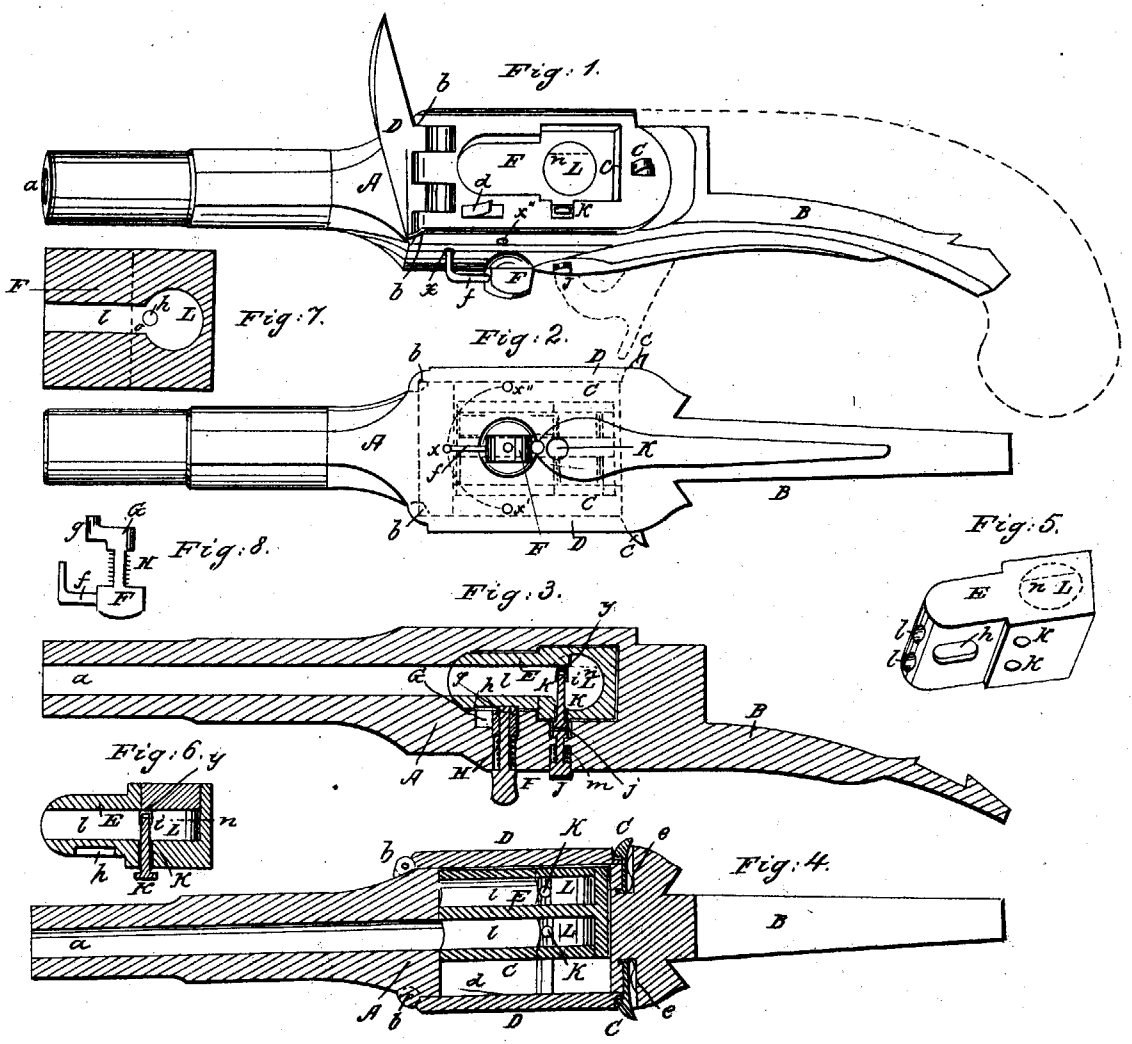
Witnesses:
Dan'l Bushnell.
J. W. Burkes.
Inventors:
F. S. Vittum.
E. M. Stevens.
By
A. B. Elgutty, Atty.
N. PETERS, Photo-Lithographer, Washington, D. C.

UNITED STATES PATENT OFFICE.

ALFRED B. ELY, OF NEWTON, ASSIGNEE OF FRANCIS J. VITTUM AND EDGAR M. STEVENS, OF BOSTON, MASSACHUSETTS.

IMPROVEMENT IN BREECH-LOADING FIRE-ARMS.

Specification forming part of Letters Patent No. 33,560, dated October 22, 1861; Reissue No. 3,653, dated September 28, 1869.

*To all whom it may concern:*

Be it known that FRANCIS J. VITTUM and EDGAR M. STEVENS, of Boston, in the State of Massachusetts, have invented certain new and useful Improvements in Fire-Arms, and in the inclosed charges and charge-chambers of the same, of which the following, with the drawings, is a correct description.

Figure 1 is a view of a portion of a gun with double-chambered receptacle for the charge; Fig. 2, an under side view of the same; Fig. 3, a vertical section of the same; Fig. 4, a horizontal section of the same; Fig. 5, a view of the double-chambered sliding charge-holder, the axis of the cylinders horizontal; Fig. 6, a vertical section of a single-chambered charge-holder, the axis of the cylinder perpendicular; Fig. 7, a horizontal section of the last named; Fig. 8, a view of the crank for operating breech-piece.

These improvements are of such a nature that, while with ordinary caps and powder in common form a less quantity of powder may be used, the whole of the powder may be essentially consumed in the charge-chamber, the cap or priming may be placed inside the charge-holder, the cap or priming may be exploded by an ordinary hammer, the explosive noise may be diminished, the projectile force may be increased, the cap or priming and charge may be protected from dampness or wet, the recoil may be lessened, and a movable breech-piece with two chambers may be adapted to one barrel. The receptacle or case for holding the powder and ball is constructed in such manner that the receptacle for the powder is enlarged below or behind the seat of the ball, while the priming is also introduced into the receptacle for the powder.

In the drawings, A B is the barrel and breech, *a* being the bore, and C a cavity or chamber in rear for receiving the movable receptacle for containing the charge E. This cavity is closed by hinged doors or lids D, hinged at *b*, and fastened, when shut, by spring-catches *c*, having springs at *e*.

*d* is a small flat spring to throw open the doors when released from their catches.

E in Figs. 1, 2, 3, 4, and 5 is a double-chambered charge-holder, and in Figs. 6 and 7 a single charge-holder, L being the powder-receptacle, and *l* that of the ball, which last is essentially of the bore of the barrel of the gun.

F H G *g* is a crank for operating the sliding charge-holder E, F being a button on the under side of the gun, to be turned with the fingers. G is an arm of the crank within the cavity C, having a projecting pin, *g*, which takes into the slot *h* of the sliding charge-holder. Around the crank-shaft H, which is smaller than the button and arm, is a spiral spring for the purpose of pressing the pin *g* into the slot *h*. *f* is an index-finger attached to F, and taking into the holes *x x′ x″*. When *f* is at *x*, neither of the barrels or chambers of the charge-holder is in line with the bore of the barrel. When it is at *x′*, one of them is in line, and when at *x″* the other. When the charge-holders are to be taken out of the cavity, the crank must be placed with *f* at *x*, and then pulled down so as to bring the pin below the cavity *h*, a space being cut for the purpose. The charge-holders may have a rack, and be operated by a pinion, or be operated directly by means of a lever.

J *j* is a double-headed spring-rod or firing-pin, having one head, J, on the under side of the gun, and another, *j*, in the cavity C, while the smaller intermediate shank, *m*, is surrounded with a spiral spring, pressing it downward.

K is a cap-pin with its cap *i*, having a head on the under side, and passing up into the charge-chamber at *k*, and striking on an anvil at *y*. The hammer striking upon J, the cap or priming *i* is exploded at *y*. The firing-rod may be made to strike directly on the cap or priming by a little change.

In charging L the cap-pin is capped and inserted and the powder introduced through *l*, and then the ball inserted into *l*. A single charge-holder may be inserted directly into the breech of the gun.

In order to accomplish the principal beneficial results of this invention, the receptacle for the powder is made considerably larger than the receptacle for the ball or the bore of the barrel. A flat cylinder of a thickness equal to the bore of the barrel has been used, and the diameter twice that of the barrel, and it has been used perpendicular to the top, as in Fig. 6, or to the sides, as in Fig. 3; but the form of the powder-receptacle is immaterial, if it be only materially larger than the bore of the gun-barral in advance of the ball. In charging the powder-holder it is not usually filled with powder, but only two-thirds or three-fourths full—say to the dotted line *n*. If filled, it is preferred that the powder should lie loosely in it, that there may be air in and with it. With this kind of charge-holder it has been found that a small charge of powder will develop a very large projectile force. By placing the cap or priming in front, the powder is more thoroughly consumed, while by the position of explosion of the cap the ball being started from its inertia, the whole explosive force of powder is essentially expanded in the direct forward expulsion of the ball, the noise is less, and the recoil is modified. This kind of powder-receptacle operates advantageously on the movement of the ball by the action of the powder at the center and from the sides of the axis of the holder. For large guns it is thought this kind of charge holder or chamber may prove very valuable. By means of the double sliding charge-holder all the essential benefits of a double-barreled gun are obtained, and powder and priming are protected from the weather.

Is is known that charge-chambers have been made in guns a little larger than the bore of barrel; but that has been the case mainly in rifled arms, and then the enlargement is such only as would ordinarily be obtained by cutting away the lands and leaving the bore the size of the depths of the grooves, and this has been for the purpose of introducing a ball or cartridge case with this slight additional size, so that the ball may be forced forward and fill the grooves and prevent windage, or so that the cartridge may be of the full size of the bore without its case or envelope; but it is not known that any powder or charge-holders have been before made materially larger than the bore of the barrel. It is not desired to be limited to the exact forms described, but claim any analogous or equivalent devices for producing like results by substantially similar means.

What is claimed is—

1. The charge-holder materially larger than the bore of the barrel, substantially as described.

2. The devices for exploding the charge, constructed, arranged, and operating substantially as described.

3. The devices for moving and locking the movable chambers, constructed, arranged, and operating substantially as described.

ALFRED B. ELY.

Witnesses:
W. M. PARKER,
W. J. JOHNSON.